(12) United States Patent
Machida et al.

(10) Patent No.: US 8,059,307 B2
(45) Date of Patent: Nov. 15, 2011

(54) IMAGE PROCESSING APPARATUS AND METHOD DIVIDING IMAGE DATA FOR MULTI-PASS SCANS USING MASK BASED ON BEAM DEVIATIONS

(75) Inventors: Yoshihito Machida, Yokohama (JP); Hideki Kubo, Kawasaki (JP); Hitoshi Fukamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 12/368,114

(22) Filed: Feb. 9, 2009

(65) Prior Publication Data

US 2009/0213394 A1  Aug. 27, 2009

(30) Foreign Application Priority Data

Feb. 21, 2008  (JP) ................. 2008-040450

(51) Int. Cl.
*G06K 15/12* (2006.01)
*H04N 1/23* (2006.01)
*H04N 1/036* (2006.01)
*H04N 1/047* (2006.01)
*H04N 1/19* (2006.01)
*H04N 1/401* (2006.01)
*B41J 2/45* (2006.01)
*G05K 15/14* (2006.01)
*H04N 1/29* (2006.01)

(52) U.S. Cl. ........ 358/1.7; 358/3.26; 358/300; 347/130; 347/238

(58) Field of Classification Search .............. 358/1.7, 358/3.26, 504, 406, 300, 302; 347/129, 130, 347/132, 233–238, 241
See application file for complete search history.

(56) References Cited

U.S. PATENT DOCUMENTS
2009/0185024 A1 * 7/2009 Fukamachi et al. .......... 347/236

FOREIGN PATENT DOCUMENTS
JP  5-294005  11/1993
JP  2003-182149  7/2003

OTHER PUBLICATIONS

R. Floyd, et al., "An Adaptive Algorithm for Spatial Grey Scale", SID International Symposium Digest of Technical Papers, vol. 4.3, 1975, pp. 36-37.

* cited by examiner

*Primary Examiner* — Scott A Rogers
(74) *Attorney, Agent, or Firm* — Fitzpatrick, Cella, Harper & Scinto

(57) ABSTRACT

An image processing apparatus includes an emitter which has a plurality of light emitting devices arranged in a sub-scan direction, and a former which forms an image on a photosensitive member by multi-passed scanning an identical region on the photosensitive member in a main scan direction using light beams output from the respective light emitting devices of the emitter. An input section inputs image data of an image to be formed by the image processing apparatus. A divider divides the input image data into image data for respective scans in the multi-passed scans using a mask pattern generated based on amounts of deviations from scan lines of the light beams output by the respective light emitting devices of the emitter. A supplier supplies the divided image data to the emitter in accordance with scans of the former.

8 Claims, 14 Drawing Sheets

| 7 | 8 | 11 | 15 |
|---|---|----|----|
| 10 | 1 | 2 | 12 |
| 13 | 3 | 4 | 6 |
| 16 | 14 | 9 | 5 |

| ON | OFF | ON | OFF | ON | OFF | ON | OFF | ON | OFF |
|----|-----|----|----|----|-----|----|-----|----|-----|
| OFF | ON | OFF | ON | OFF | ON | OFF | ON | OFF | ON |
| OFF | ON | OFF | ON | OFF | ON | OFF | ON | OFF | ON |
| ON | OFF | ON | OFF | ON | OFF | ON | OFF | ON | OFF |

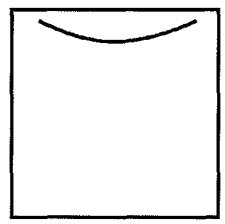 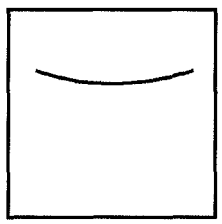 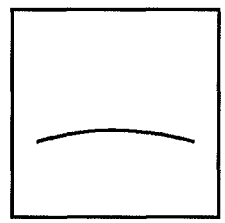 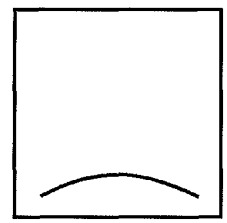
FIG. 8A    FIG. 8B    FIG. 8C    FIG. 8D
| 5 | 3 | 2 | 1 | 0 | 0 | 1 | 2 | 5 | 3 |
|---|---|---|---|---|---|---|---|---|---|
| 3 | 3 | 1 | 1 | 0 | 0 | 1 | 1 | 3 | 3 |
| 3 | 2 | 1 | 1 | 0 | 0 | 2 | 2 | 2 | 4 |
| 4 | 4 | 2 | 2 | 0 | 0 | 2 | 2 | 4 | 4 |
FIG. 9
| 3 | 2 | 1 | 1 | 0 | 0 | 2 | 2 | 2 | 4 |
|---|---|---|---|---|---|---|---|---|---|
| 4 | 4 | 2 | 2 | 0 | 0 | 2 | 2 | 4 | 4 |
| 5 | 3 | 2 | 1 | 0 | 0 | 1 | 2 | 5 | 3 |
| 3 | 3 | 1 | 1 | 0 | 0 | 1 | 1 | 3 | 3 |
| 5 | 3 | 2 | 1 | 0 | 0 | 1 | 2 | 5 | 3 |
|---|---|---|---|---|---|---|---|---|---|
| 3 | 3 | 1 | 1 | 0 | 0 | 1 | 1 | 3 | 3 |
| 3 | 2 | 1 | 1 | 0 | 0 | 2 | 2 | 2 | 4 |
| 4 | 4 | 2 | 2 | 0 | 0 | 2 | 2 | 4 | 4 |
FIG. 10A                FIG. 10B

FIG. 11

| 255 | 192 | 160 | 96 | 255 | 192 | 160 | 96 | 255 | 192 |
|---|---|---|---|---|---|---|---|---|---|
| 224 | 16 | 32 | 128 | 224 | 16 | 32 | 128 | 224 | 16 |
| 112 | 48 | 64 | 208 | 112 | 48 | 64 | 208 | 112 | 48 |
| 80 | 144 | 176 | 240 | 80 | 144 | 176 | 240 | 80 | 144 |

602 — OFF

604 — OFF

| ON | ON | ON | OFF | OFF | OFF | OFF | OFF | ON | OFF |
|---|---|---|---|---|---|---|---|---|---|
| OFF | ON | ON | ON | ON | ON | ON | ON | OFF | ON |
| OFF | OFF | OFF | ON | ON | ON | ON | ON | OFF | ON |
| ON | OFF | OFF | OFF | OFF | OFF | OFF | OFF | ON | OFF |

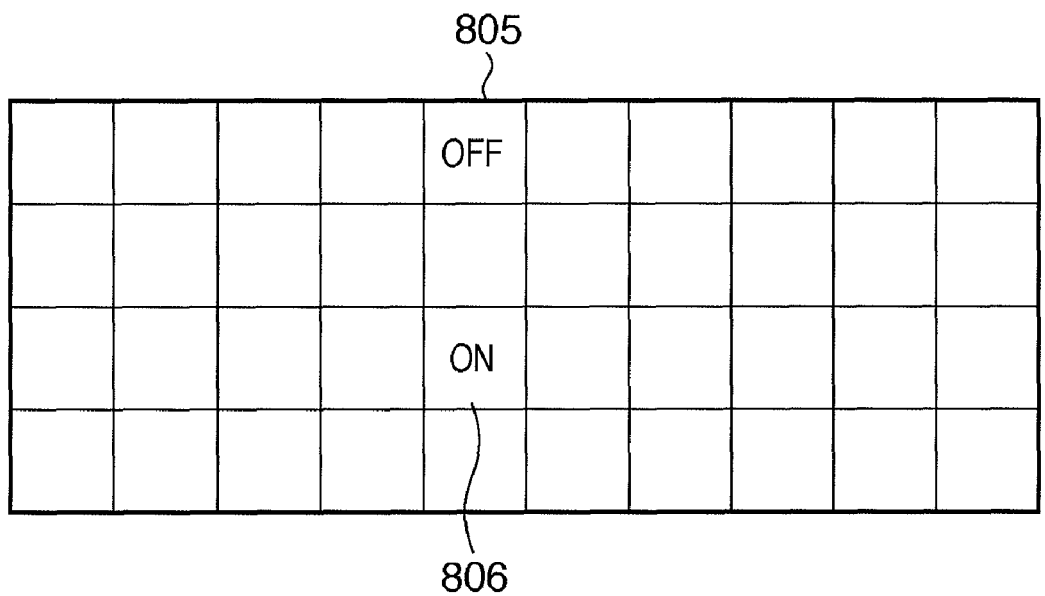

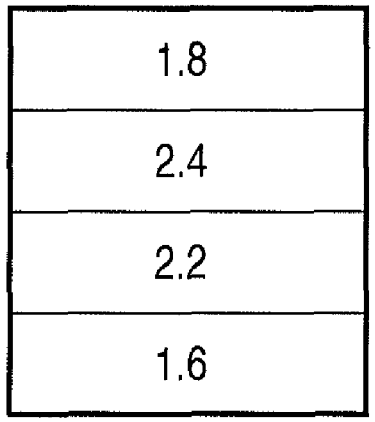
F I G. 22A
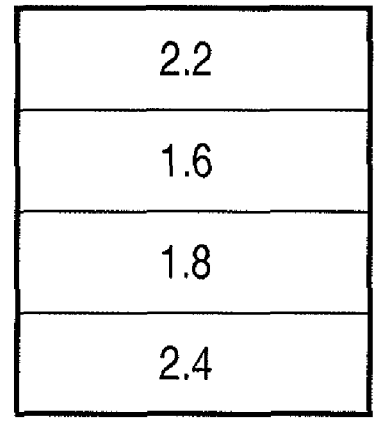
F I G. 22B
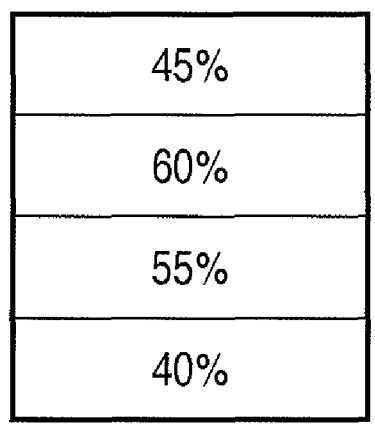
F I G. 23

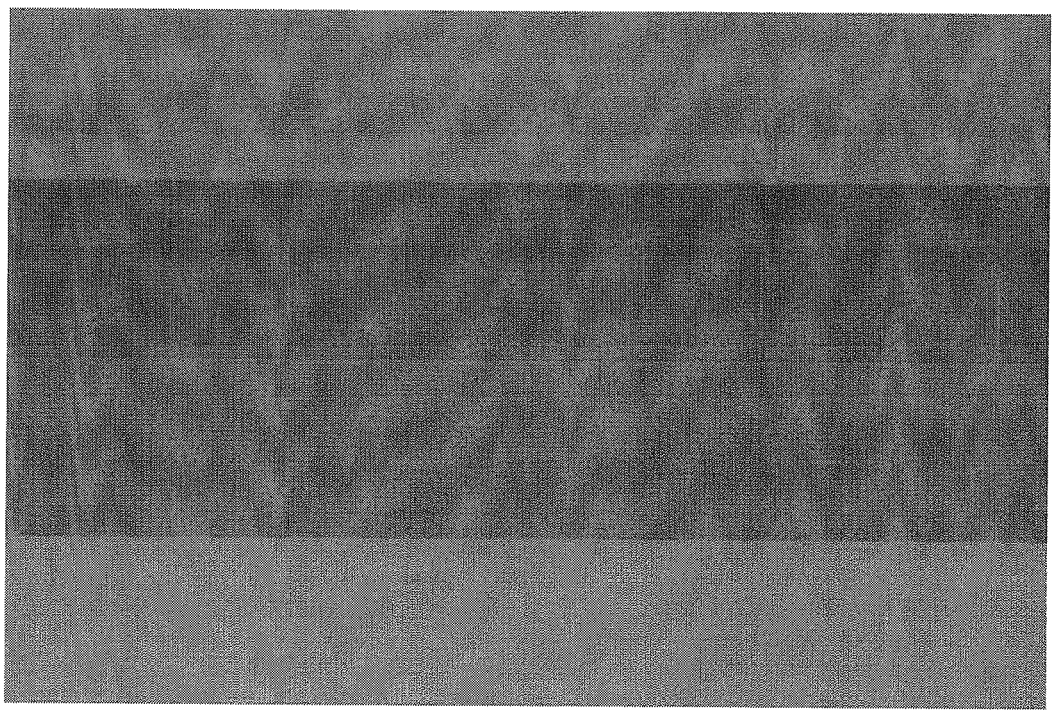
F I G. 24
| OFF | ON | OFF | ON | OFF |
|-----|-----|-----|-----|-----|
| ON | OFF | ON | OFF | ON |
| ON | OFF | ON | OFF | ON |
| OFF | ON | OFF | ON | OFF |
F I G. 25

IMAGE PROCESSING APPARATUS AND METHOD DIVIDING IMAGE DATA FOR MULTI-PASS SCANS USING MASK BASED ON BEAM DEVIATIONS

BACKGROUND OF THE INVENTION

1. Field of the Invention

The present invention relates to formation of an image using a recording device having a plurality of light emitting devices.

2. Description of the Related Art

An image forming apparatus of an electrophotography system forms a latent image according to an image signal by scanning and exposing the surface of a photosensitive drum or belt with a laser beam or the like, and develops and transfers the latent image onto a print sheet, thus forming an image on it. The image forming apparatus of the electrophotography system is required to make concurrent scans using a plurality of light beams so as to increase the speed and resolution.

It is difficult to integrate a semiconductor laser diode (LD) of edge emitting type generally used as a light source of an optical scanning device, and the number of beams that can be concurrently used in scanning and exposure is as small as four. Hence, a vertical cavity surface emitting laser diode (VCSEL) including a two-dimensional array of a plurality of light emitting points is used as a light source of an optical scanning device. The VCSEL can be easily arrayed: when the VCSEL is used as a light source, a photosensitive member can concurrently undergo scanning and exposure using a larger number of light beams.

When a multi-beam array like the VCSEL is used, a heterogeneity of density in a lateral streak pattern (streak heterogeneity) is often generated in an output image due to a non-uniform exposure amount on a photosensitive member. In order to solve such problem, a method of suppressing a streak heterogeneity of a superimposition part one scan before by adjusting the laser light amounts at the upper and lower ends of the multi-beam array, and a method of setting uniform laser light amounts in the multi-beam array are available.

When the multi-beam array is used, a scan line formed by a laser beam that does not pass through an optical axis becomes a curve having an arcuate distortion (to be referred to as a curvature hereinafter) due to a distortion aberration of an optical system, and the curvature results in an image quality drop such as a heterogeneity of density of an output image. Conventionally, since the exposure amounts in the main scan direction (the scanning direction of a laser beam) are the same, the image quality drop due to the curvature cannot be decreased.

SUMMARY OF THE INVENTION

In one aspect, there is provided an image processing apparatus comprising: an emitter which has a plurality of light emitting devices arranged in a sub-scan direction; a former arranged to form an image on a photosensitive member by multi-passed scanning an identical region on the photosensitive member in a main scan direction using light beams output from the respective light emitting devices of the emitter; an input section arranged to input image data of an image to be formed by the former; a divider arranged to divide the image data input by the input section into image data for respective scans in the multi-passed scans using a mask pattern generated based on amounts of deviation from scan lines of the light beams output by the respective light emitting devices; and a supplier arranged to supply the image data divided by the divider to the emitter in accordance with scans of the former.

According to the aspect, there is provided an image quality drop of an output image due to deviations from scan lines of light beams output from a plurality of light emitting devices can be decreased.

Further features of the present invention will become apparent from the following description of exemplary embodiments with reference to the attached drawings.

BRIEF DESCRIPTION OF THE DRAWINGS

FIGS. 8A to 8D are views showing examples of scan line images;

FIG. 9 and FIGS. 10A and 10B are tables showing the measurement results of amounts of deviation from scan lines;

FIG. 11 is a view showing a threshold matrix prepared by arranging a threshold matrix 501 of 4×4 pixels for 10×4 pixels;

FIGS. 12 to 14 are views for explaining the generation states of a mask pattern;

FIG. 15 is a view showing an example of a mask pattern;

FIGS. 17 to 19 are views for explaining the generation states of a mask pattern;

FIG. 20 is a view showing an example of a mask pattern;

FIGS. 22A and 22B are views showing examples of mean amounts of deviation;

FIG. 23 is a view showing the calculation results of duties of the respective devices from the mean amounts of deviation shown in FIGS. 22A and 22B;

FIG. 24 is a view showing an example of an image having a mask pattern size (5×4 pixels), which is generated according to the duties shown in FIG. 23; and FIG. 25 is a view showing a mask pattern obtained from the image used to generate a mask pattern.

DESCRIPTION OF THE EMBODIMENTS

Image processing according to embodiments of the present invention will be described in detail hereinafter with reference to the drawings.

First Embodiment

[Arrangement and Operation of Apparatus]

Figure 1:
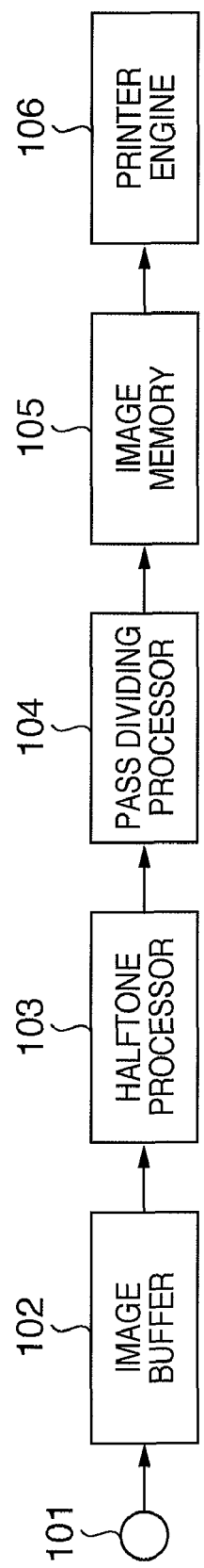
FIG. 1 is a block diagram showing the arrangement of an image processing apparatus according to an embodiment.
Figure 2:
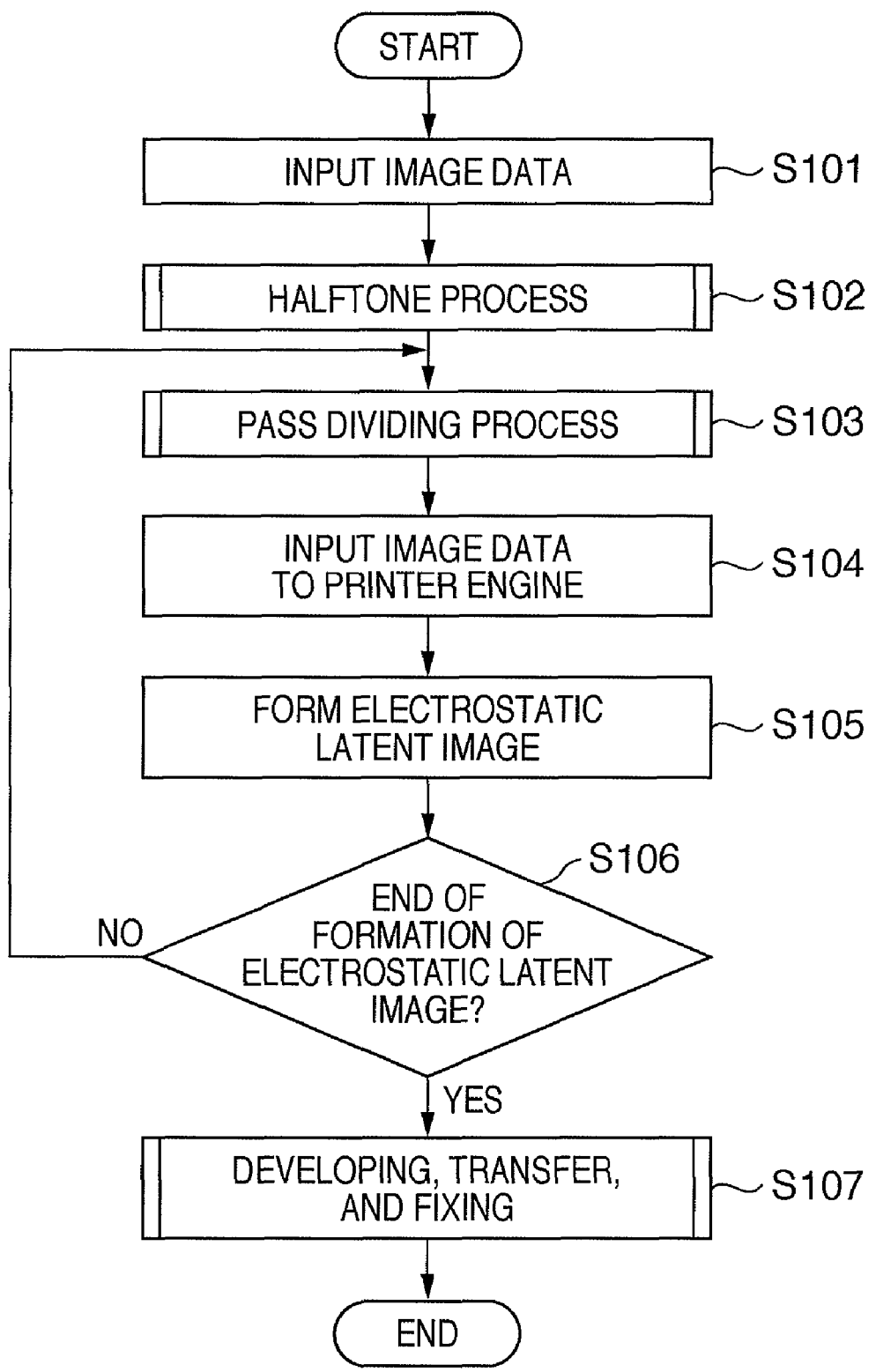
FIG. 2 is a flowchart for explaining the operation of the image processing apparatus.

FIG. 1 is a block diagram showing the arrangement of an image processing apparatus according to an embodiment, and FIG. 2 is a flowchart for explaining the operation of the image processing apparatus.

An image processing apparatus receives multi-tone image data from an input unit 101, and stores the input image data in an image buffer 102 (S101). A halftone processor 103 executes a halftone process for converting the tonal number of image data stored in the image buffer 102 into a smaller tonal number (S102).

The halftone processor 103 uses a threshold table so as to convert multi-tone image data into binary image data (or image data expressed by three values or more and having a tonal number smaller than the input tonal number). For example, when input image data is expressed by 256 tones, a threshold matrix is expressed using at least 16×16 cells so as to express 256 tones. Tiling of thresholds is made for respective cells of the threshold matrix in a predetermined order, and the value of each pixel of the image data is compared with a threshold, so that the pixel, the value of which exceeds the threshold, is set as an ON dot, and the pixel, the value of which is equal to or smaller than the threshold, is set as an OFF dot. That is, each tone of an input image is expressed by the area ratio of ON- and OFF-dot pixels.

Figures 3, 4, 5:
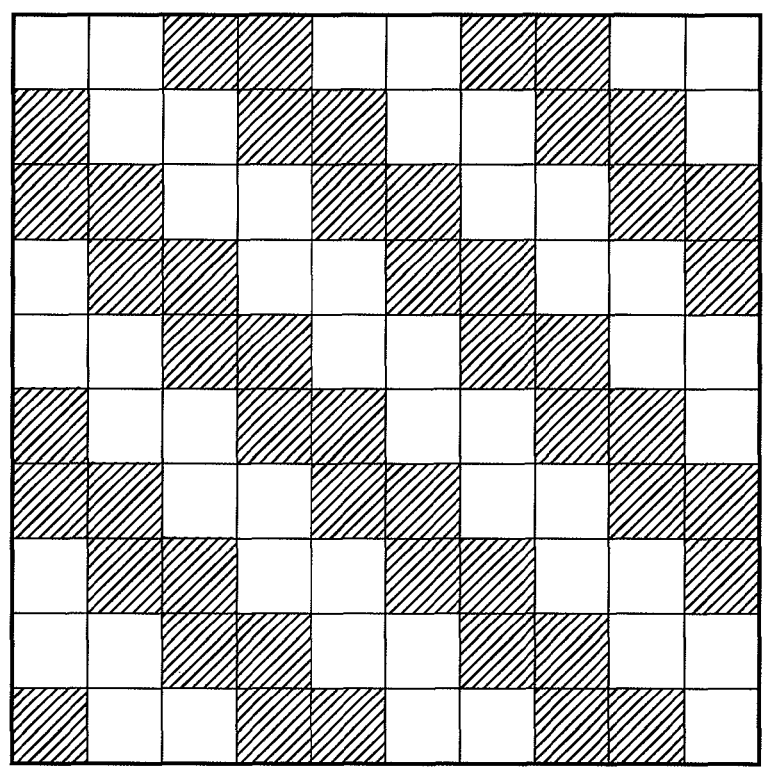
FIG. 3 is a view showing an example of a threshold table.
FIG. 4 is a view showing an example of a binary image after a halftone process.
FIG. 5 is a view showing a mask pattern for a two-pass dividing process.

FIG. 3 is a view showing an example of the threshold table. Numerals in respective cells indicate thresholds (a maximum value=16). Note that various kinds of halftone processes such as an FM screen method, error diffusion method, and blue noise mask method are available, and any of these halftone processes can be applied to the image processing apparatus of this embodiment.

A pass dividing processor 104 executes a process for dividing the entire image of the image data that has undergone the halftone process or an image having an arbitrary image size for a unit recording region (band width) into data as many as the number of scan times (the number of passes: an integer equal to or larger than 2) (to be referred to as a pass dividing process hereinafter). The processor 104 stores image data that has undergone the pass dividing processing in an image memory 105 (S103). An example in which binary image data that has undergone the halftone process is divided into two image data for respective scans to have the number of passes=2 for the sake of simplicity will be explained below.

The pass dividing processor 104 executes the pass dividing process using a mask pattern. That is, the processor 104 generates image data of respective passes by calculating the logical product of the image data after the halftone process, and the mask pattern.

FIG. 4 is a view showing an example of the binary image after the halftone process. FIG. 5 is a view showing a mask pattern for a 2-pass dividing process (for 2-pass printing). Note that respective cells in FIG. 5 indicate ON and OFF of a laser beam.

An example in which image data after the pass dividing process are generated using a mask pattern generated in accordance with the amounts of deviation from scan lines of laser beams of an image forming apparatus will be described below. Note that details of the generation method of a mask pattern will be described later.

The image processing apparatus supplies, to the printer engine 106, the image data after the pass dividing process stored in the image memory 105 to have an arbitrary image size such as the entire image or a band width (S104).

A printer engine 106 sets toner colors and laser output values in accordance with the input image data, and forms a latent image by multi-passed scanning an identical region on a photosensitive member (S105).

The image processing apparatus then determines if formation of a latent image for the entire image is complete (S106). If formation of a latent image is not complete yet, the apparatus determines that the pass dividing process is not complete yet, and the process returns to step S103. If formation of a latent image for the entire image is complete, the printer engine 106 forms an output image by executing image forming processes including toner development of the latent image, transfer of a toner image, and fixing of the toner image (S107).

[Multi-Pass Printing]

Figure 6:
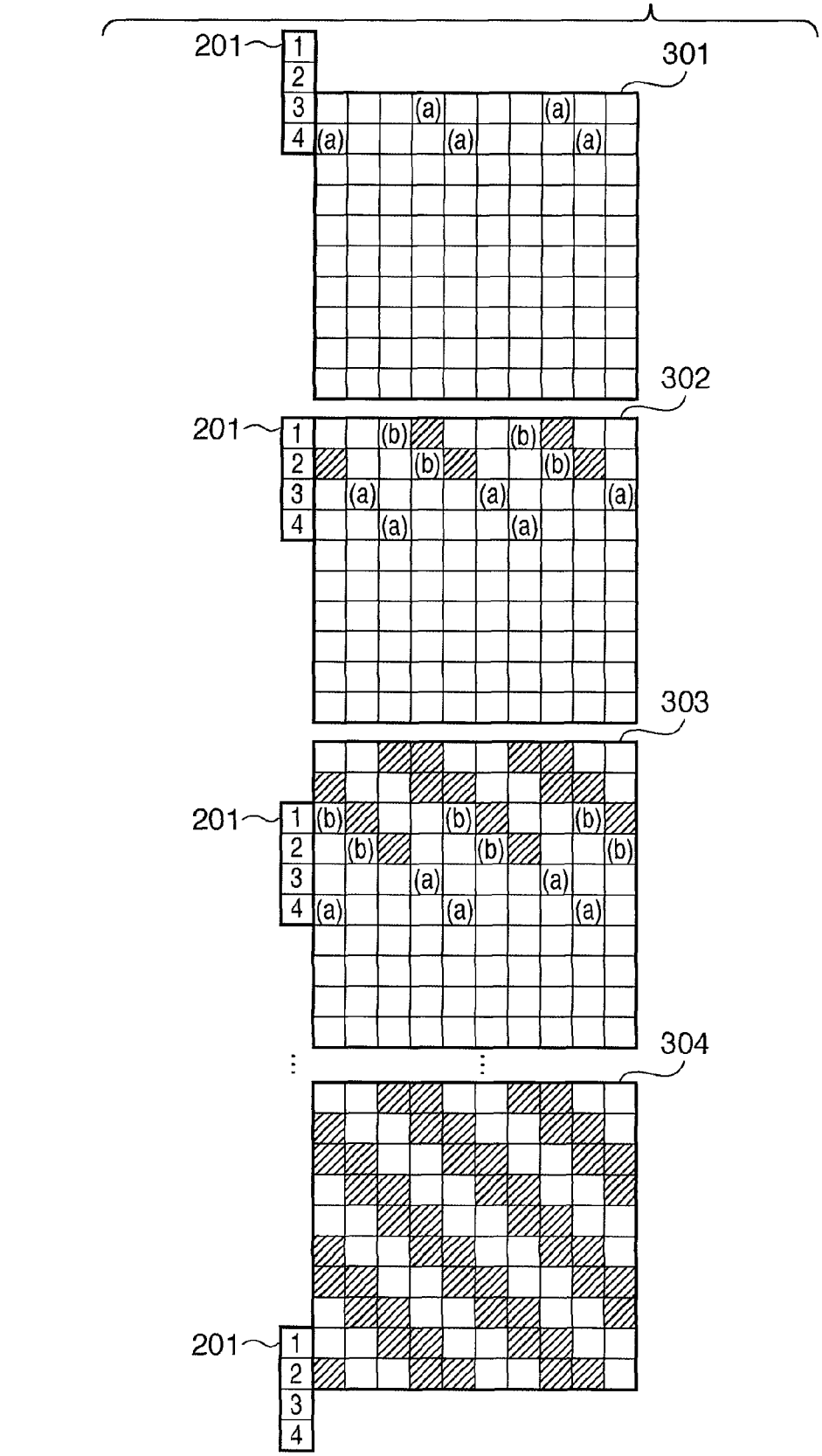
FIG. 6 is a view showing the states of the pass dividing process of the binary image shown in FIG. 4 using the mask pattern shown in FIG. 5.

FIG. 6 is a view showing the states of the pass dividing process of the binary image shown in FIG. 4 using the mask pattern shown in FIG. 5.

FIG. 6 shows 2-pass printing, and the moving amount of the photosensitive member in the sub-scan direction required for one main scan is (the number of laser devices arranged in the sub-scan direction)/(the number of passes) (4/2=two pixels in this embodiment).

Referring to FIG. 6, a multi-beam array 201 has four laser devices 1 to 4. Reference numerals 301 to 304 denote image forming regions of respective passes, cells with (a) are pixels exposed in the first pass, and those with (b) are pixels exposed in the second pass. Hatched cells are pixels which have already been exposed.

Reference numeral 301 denotes an image forming region at the time of a first scan. At this time, the multi-beam array 201 is located at a position two pixels above the image forming region, and laser devices that can be used in the scan are two devices 3 and 4 at the lower end.

Reference numeral 302 denotes an image forming region at the time of a second scan. At this time, the multi-beam array 201 moves to a position two pixels below the position at the time of the first scan. Therefore, laser devices that can be used in the scan are all devices 1 to 4.

Reference numeral 303 denotes an image forming region at the time of a third scan. At this time, the multi-beam array 201 moves to a position two pixels below the position at the time of the second scan.

Reference numeral 304 denotes an image forming region upon completion of formation of a latent image of the binary image shown in FIG. 4. As shown in FIG. 6, upon execution of 2-pass printing using the multi-beam array 201 having the four laser devices arranged in the sub-scan direction, formation of the latent image of the binary image shown in FIG. 4 is completed by a total of six main scans (in FIG. 6, three middle main scans are omitted).

Note that the example in which the number of devices of the multi-beam array 201 is 1 (main scan direction)×4 (sub-scan direction), and the light emitting intervals of the devices arranged in the sub-scan direction are adjusted to the resolution (one pixel) in the sub-scan direction of the printer engine 106 has been explained for the sake of simplicity. However, the number of devices of the multi-beam array 201 is arbitrary, and the light emitting intervals of the devices can be set in correspondence with the number of devices.

[Generation of Mask Pattern]

In the following description, assume that the printable range of the printer engine 106 in the main scan direction is defined by 10 pixels, the mask size is defined by 10×4 (the printable range in the main scan direction×the number of laser devices in the sub-scan direction), and the number of passes is 2, for the sake of simplicity.

Figure 7:
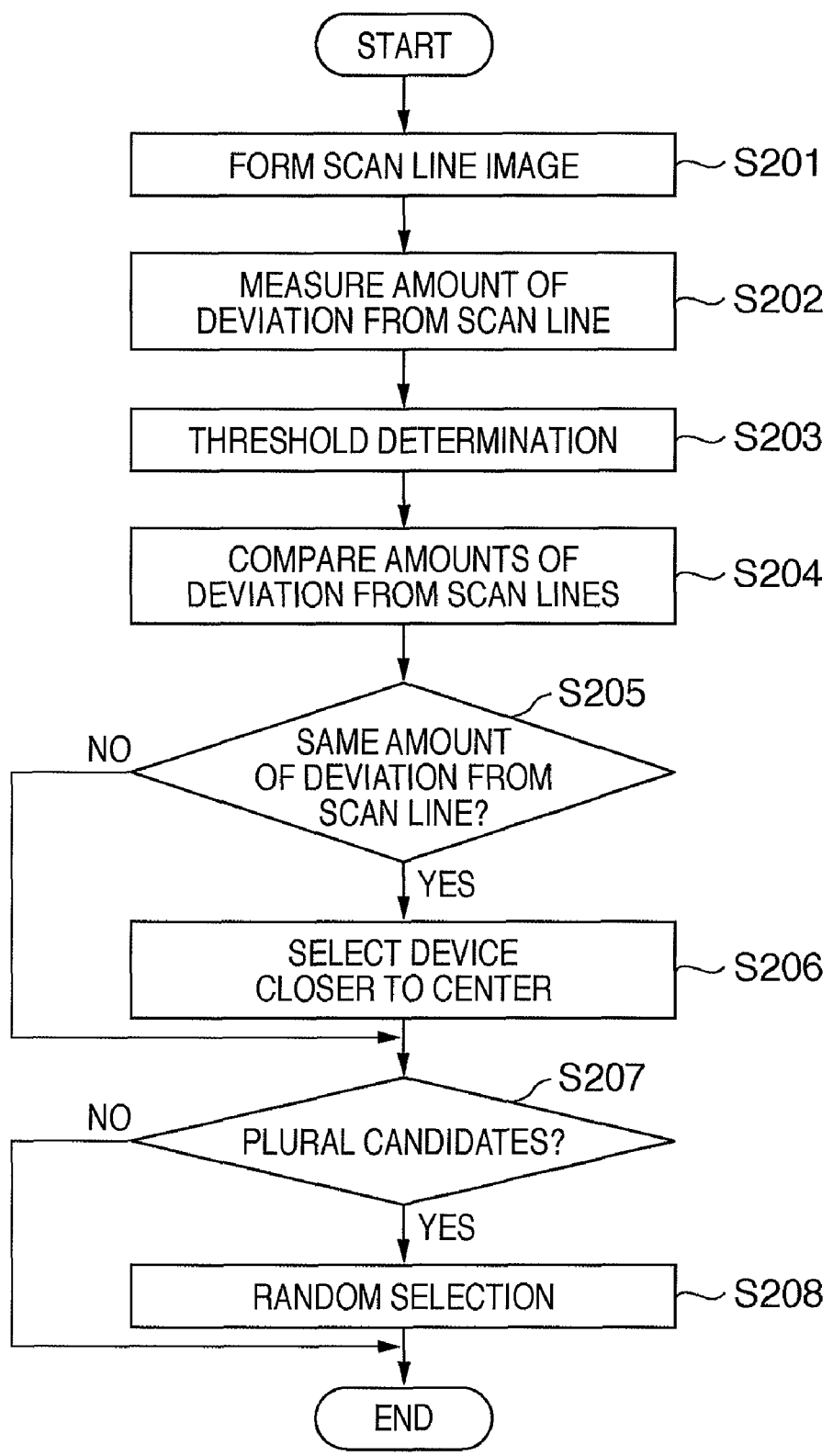
FIG. 7 is a flowchart showing an example of the generation sequence of a mask pattern.

FIG. 7 is a flowchart showing an example of the generation sequence of a mask pattern.

The respective laser devices are controlled to emit light so as to scan and expose the photosensitive body, and to form images (scan line images) used to measure the amounts of deviation from scan lines after development and fixing (S201).

More specifically, the laser devices are controlled to emit light one by one so as to form scan line images. That is, the first device of the multi-beam array is controlled to emit light, thus forming a scan line image. Subsequently, the second, third, and fourth devices are controlled to emit light in turn, thus respectively forming scan line images.

FIGS. 8A to 8D are views showing examples of scan line images. FIG. 8A shows a scan line image formed by the first device arranged at the uppermost position of the multi-beam array, and FIGS. 8B to 8D show scan line images formed by the second to fourth devices, respectively.

The scan line images are scanned to measure deviations between the positions of scan lines of the respective devices in the sub-scan direction and their ideal positions (amounts of deviation from scan lines), thereby generating a table shown in FIG. 9 (S202).

FIG. 9 is a table showing the measurement results of the amounts of deviation from scan lines, and the amounts of deviation from scan lines at respective pixel positions of the respective devices are juxtaposed in the horizontal direction. That is, the first row indicates the amounts of deviation from a scan line of the first device, and the second to fourth rows indicate the amounts of deviation from scan lines of the second to fourth devices. Note that a deviation from the ideal position increases with increasing amount of deviation from a scan line.

Measurement of the amounts of deviation from scan lines is not limited to that from scan line images after fixing. For example, scan lines of a latent image on the photosensitive member may be measured to acquire the amounts of deviation from scan lines.

A mask pattern is then determined based on the measurement results of the amounts of deviation from scan lines.

FIGS. 10A and 10B are tables showing the measurement results of the amounts of deviation from scan lines. FIG. 10A shows the amounts of deviation from scan lines in an odd-numbered scan, and FIG. 10B shows those in an even-numbered scan. FIG. 11 is a view showing a threshold matrix prepared by arranging a threshold matrix 501 of 4×4 pixels for 10×4 pixels. In the following description, assume that the maximum pixel value is 255, and one halftone dot size is defined by 4×4 pixels, for the sake of simplicity. However, the present invention is not limited to these maximum pixel value and halftone dot size.

Next, a mask pattern is determined. It is determined in the threshold determination process (S203) if a threshold of each cell in the threshold matrix is equal to or smaller than ½ of the maximum pixel value.

In the comparison process of the amounts of deviation from scan lines (S204), it is determined that latent image formation of a pixel corresponding to a cell, the threshold of which is equal to or smaller than ½ of the maximum pixel value in the threshold matrix, is to be performed in a scan with a smaller amount of deviation from a scan line of the odd- and even-numbered scans. Also, it is determined that latent image formation of a pixel corresponding to a cell, the threshold of which exceeds ½ of the maximum pixel value in the threshold matrix, is to be performed in a scan with a larger amount of deviation from a scan line of the odd- and even-numbered scans.

It is determined if the amount of deviation from a scan line in the odd-numbered scan is the same as that in the even-numbered scan (S205). If the amounts of deviation from scan lines are the same, it is determined in a selection process of a device closer to the center (S206) that latent image formation of the pixel of interest is performed using a device closer to the center of the multi-beam array.

If it is determined that the device for latent image formation cannot be determined in the above processes, in other words, if it is determined that there are a plurality of devices (candidates) which satisfy the selection conditions in steps S204 and S206 (S207), a device is randomly selected from the candidates in a random selection process (S208).

Note that the criteria upon generation of the mask pattern are merely examples. For example, latent image formation of a pixel corresponding to a cell, the threshold of which is equal to or smaller than ¼ of the maximum pixel value in the threshold matrix, may use a scan with a smaller amount of deviation from a scan line. Also, latent image formation of a pixel corresponding to a cell, the threshold of which exceeds ¼ of the maximum pixel value, may use a scan with a larger amount of deviation from a scan line.

For example, since the threshold of a cell at the upper left corner of the threshold matrix 501 shown in FIG. 11 is 255, and exceeds ½ of the maximum pixel value=255, it is determined that latent image formation of a pixel corresponding to this cell is performed in a scan with a larger amount of deviation from a scan line. Upon comparison of cells at the upper left corners of the amounts deviation from scan lines shown in FIGS. 10A and 10B, the amount of deviation from a scan line in the odd-numbered scan is "3", and that in the even-numbered scan is "5". That is, latent image formation of a pixel corresponding to the cell at the upper left corner generates a larger amount of deviation from a scan line using the even-numbered scan than the odd-numbered scan. Therefore, the mask pattern is generated so that latent image formation of a pixel corresponding to the cell at the upper left corner uses the even-numbered scan.

FIG. 12 is a view for explaining the generation state of the mask pattern. In FIG. 12, when a cell 601 at the upper left corner is set ON, and a cell 602 at the leftmost end in the third row is set OFF, latent image formation of a corresponding pixel is performed in the even-numbered scan.

Also, since the threshold of a cell at the rightmost end in the second row in the threshold matrix 501 shown in FIG. 11 is 16, and is equal to or smaller than ½ of the maximum pixel value=255, it is determined that latent image formation of a pixel corresponding to this cell is performed in a scan with a smaller amount of deviation from a scan line. Upon comparison of cells at the rightmost ends in the second rows of the amounts of deviation from scan lines shown in FIGS. 10A and 10B, the amount of deviation from a scan line in the odd-numbered scan is "4", and that in the even-numbered scan is "3". That is, latent image formation of a pixel corresponding to the cell at the rightmost end in the second row generates a smaller amount of deviation from a scan line using the even-numbered scan than the odd-numbered scan. Therefore, the mask pattern is generated so that latent image formation of a pixel corresponding to the cell at the rightmost end in the second row uses the even-numbered scan.

FIG. 13 is a view for explaining the generation state of the mask pattern. In FIG. 13, when a cell 603 at the rightmost end in the second row is set ON, and a cell 604 at the rightmost end in the fourth row is set OFF, latent image formation of a corresponding pixel is performed in the even-numbered scan.

Furthermore, since the threshold of a cell at the fifth column position in the first row in the threshold matrix 501 shown in FIG. 11 is 255, and exceeds ½ of the maximum pixel value=255, it is determined that latent image formation of a pixel corresponding to this cell is performed in a scan with a larger amount of deviation from a scan line. Upon comparison of cells at the fifth column positions in the first rows of the amounts of deviation from scan lines shown in FIGS. 10A and 10B, the amount of deviation from a scan line in the odd-numbered scan is "0", and that in the even-numbered scan is also "0". That is, latent image formation of a pixel corresponding to the cell at the fifth column position in the first row generates the same amount of deviation from a scan line using either the even- or odd-numbered scan. In this case, a device closer to the center of the multi-beam array is selected, and the odd-numbered scan uses a device closer to the center than the even-numbered scan. Therefore, the mask pattern is generated so that latent image formation of a pixel corresponding to the cell at the fifth column position in the first row uses the odd-numbered scan.

Figures 14, 15:
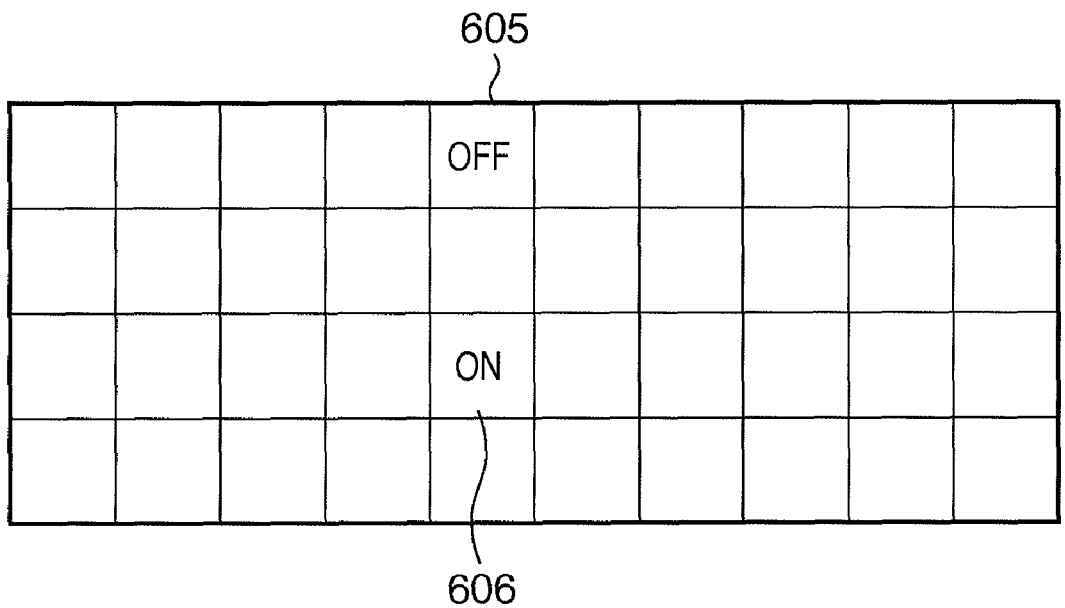

FIG. 14 is a view for explaining the generation state of the mask pattern. In FIG. 14, when a cell 605 at the fifth column position in the first row is set OFF, and a cell 606 at the fifth column position in the third row is set ON, latent image formation of a corresponding pixel is performed in the odd-numbered scan.

In this way, by generating the mask pattern using a device closer to the center of the multi-beam array when the same amount of deviation from a scan line is generated, a heterogeneity of density generated due to repetition of exposure as a result of the nonuniform rotation and moving amount of the photosensitive member can be decreased.

By repeating the sequence in steps S203 to S208 (the number of pixels of the printer engine 106 in the main scan direction)×(½ of the number of devices of the multi-beam array in the sub-scan direction) times (10×2=20 times in this example), a mask pattern shown in FIG. 15 is generated. Note that the mask pattern may be generated by repeating the processes for the size of the threshold matrix.

When the pass dividing process is executed using the mask pattern generated in this way, a device with a smaller amount of deviation from a scan line can be preferentially assigned to latent image formation of a pixel corresponding to a cell with a smaller threshold. Also, a device with a larger amount of deviation from a scan line is assigned to latent image formation of a pixel corresponding to a cell with a larger threshold.

A cell with a smaller threshold forms a latent image even when the pixel value is small. A pixel, the latent image of which is formed in such situation, tends to be an isolated point that suffers a serious influence of the deviation from a scan line. Therefore, when a device with a smaller amount of deviation from a scan line is used in latent image formation of a pixel corresponding to a cell with a smaller threshold, the influence of the deviation from a scan line on the isolated point is decreased, thus improving the image quality of an output image.

Second Embodiment

Image processing according to the second embodiment of the present invention will be described hereinafter. Note that the same reference numerals in the second embodiment denote the same parts as in the first embodiment, and a detailed description thereof will not be repeated.

The second embodiment is the same as the first embodiment, except for the generation method of a mask pattern to be described below. In the following description, assume that the number of devices of the multi-beam array 201 is 1 (main scan direction)×4 (sub-scan direction) as in the first embodiment, for the sake of simplicity. Likewise, in the following description, assume that the printable range of the printer engine 106 in the main scan direction is defined by 10 pixels, the mask size is defined by 10×4 (the printable range in the main scan direction×the number of laser devices in the sub-scan direction), and the number of passes is 2.

Figure 16:
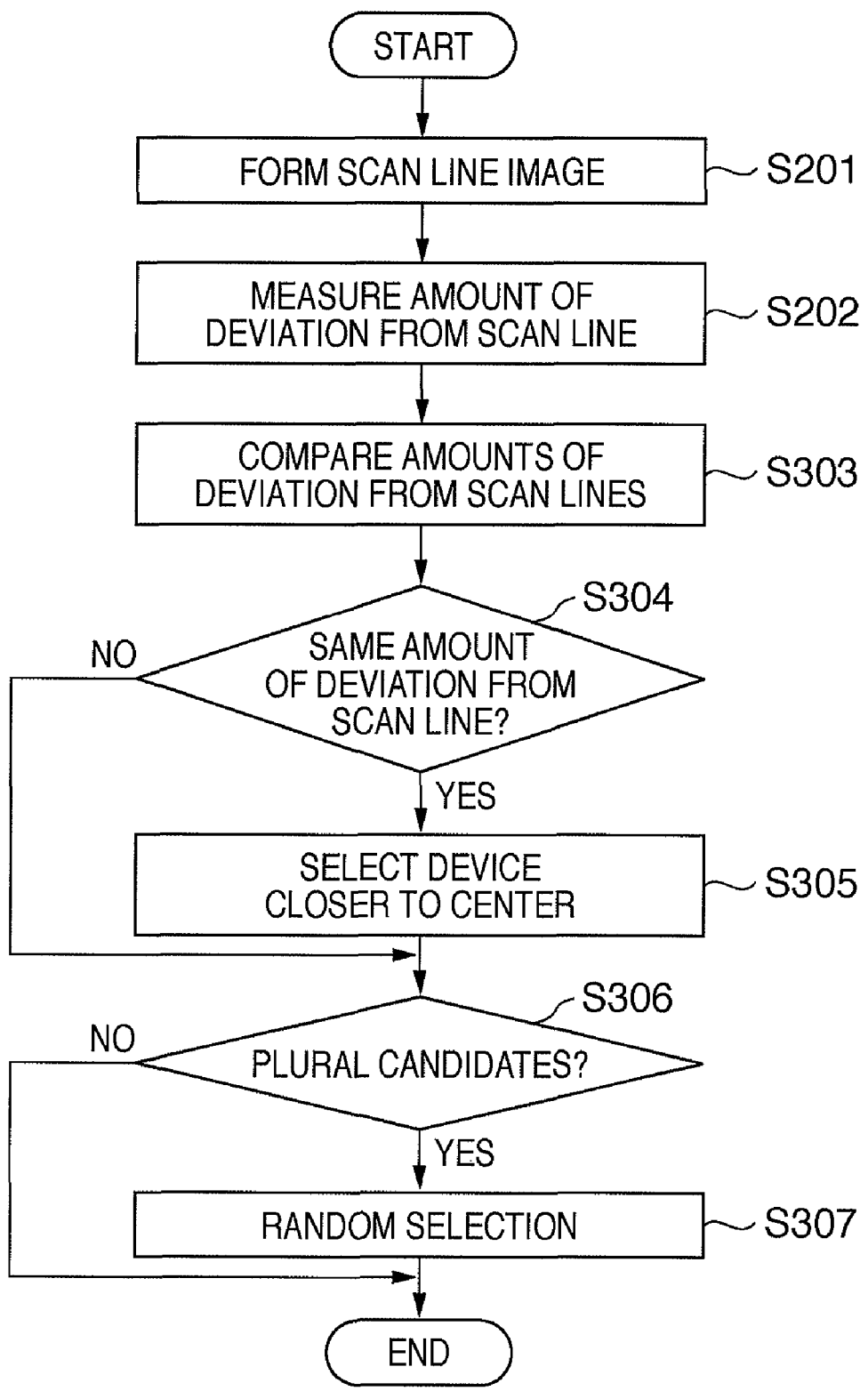
FIG. 16 is a flowchart showing an example of the generation sequence of a mask pattern according to the second embodiment.

FIG. 16 is a flowchart for explaining an example of the generation sequence of a mask pattern according to the second embodiment. The processes in steps S201 and S202 are the same as those in the first embodiment.

After the measurement of the amounts of deviation from scan lines, in a comparison process of the amounts of deviation from scan lines (S303), it is determined that latent image formation of a pixel corresponding to each cell is performed in a scan with a smaller amount of deviation from a scan line of the odd- and even-numbered scans.

It is then determined if the amount of deviation from a scan line in the odd-numbered scan is the same as that in the even-numbered scan (S304). If the amount of deviation from a scan line is the same, it is determined in a selection process of a device closer to the center (S305) that latent image formation of the pixel of interest is performed using a device closer to the center of the multi-beam array.

If it is determined that the device for latent image formation cannot be determined in the above processes, in other words, if it is determined that there are a plurality of devices (candidates) which satisfy the selection conditions in steps S303 and S305 (S306), a device is randomly selected from the candidates in a random selection process (S307).

Note that the criteria upon generation of the mask pattern are merely examples. For example, when a device cannot be determined in the device selection processes in steps S303 and S305, a criterion of determining a device that can form a largest run of ON or OFF cells may be used.

Upon comparison of cells at the upper left corners of the amounts of deviation from scan lines shown in FIGS. 10A and 10B, the amount of deviation from a scan line in the odd-numbered scan is "3", and that in the even-numbered scan is "5". That is, latent image formation of a pixel corresponding to the cell at the upper left corner generates a smaller amount of deviation from a scan line using the odd-numbered scan than the even-numbered scan. Therefore, the mask pattern is generated so that latent image formation of a pixel corresponding to the cell at the upper left corner uses the odd-numbered scan.

Figure 17:
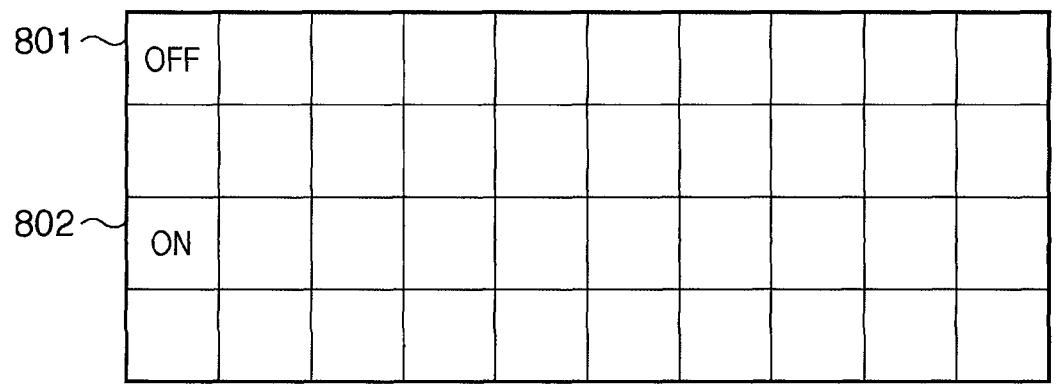

FIG. 17 is a view for explaining the generation state of the mask pattern. In FIG. 17, when a cell 801 at the upper left corner is set ON, and a cell 802 at the leftmost end in the third row is set OFF, latent image formation of a corresponding pixel is performed in the odd-numbered scan.

Also, upon comparison of cells at the rightmost ends in the second rows of the amounts of deviation from scan lines shown in FIGS. 10A and 10B, the amount of deviation from a scan line in the odd-numbered scan is "4", and that in the even-numbered scan is "3". That is, latent image formation of a pixel corresponding to the cell at the rightmost end in the second row generates a smaller amount of deviation from a scan line using the even-numbered scan than the odd-numbered scan. Therefore, the mask pattern is generated so that latent image formation of a pixel corresponding to the cell at the rightmost end in the second row uses the even-numbered scan.

Figure 18:
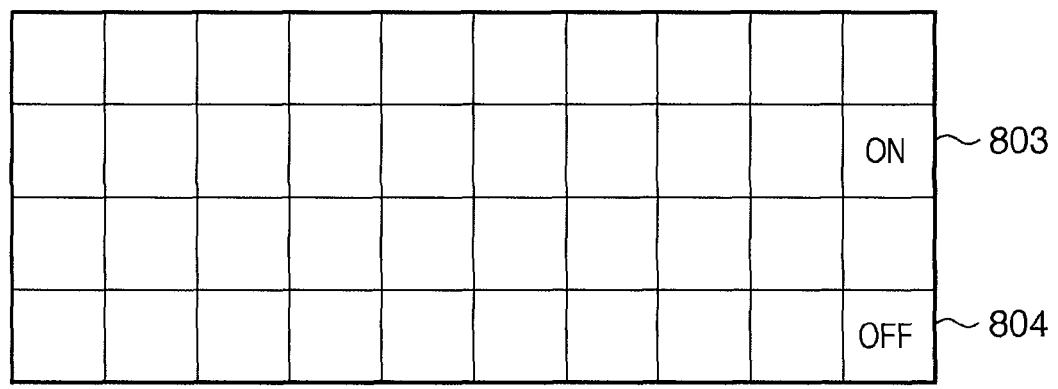

FIG. 18 is a view for explaining the generation state of the mask pattern. In FIG. 18, when a cell 803 at the rightmost end in the second row is set ON, and a cell 804 at the rightmost end in the fourth row is set OFF, latent image formation of a corresponding pixel is performed in the even-numbered scan.

Furthermore, upon comparison of cells at the fifth column positions in the first rows of the amounts of deviation from scan lines shown in FIGS. 10A and 10B, the amount of deviation from a scan line in the odd-numbered scan is "0", and that in the even-numbered scan is also "0". That is, latent image formation of a pixel corresponding to the cell at the fifth column position in the first row generates the same amount of deviation from a scan line using either the even- or odd-numbered scan. In this case, a device closer to the center of the multi-beam array is selected, and the odd-numbered scan uses a device closer to the center than the even-numbered scan. Therefore, the mask pattern is generated so that latent image formation of a pixel corresponding to the cell at the fifth column position in the first row uses the odd-numbered scan.

FIG. 19 is a view for explaining the generation state of the mask pattern. In FIG. 19, when a cell 805 at the fifth column position in the first row is set OFF, and a cell 806 at the fifth column position in the third row is set ON, latent image formation of a corresponding pixel is performed in the odd-numbered scan.

By repeating the sequence in steps S303 to S307 (the number of pixels of the printer engine 106 in the main scan direction)×(½ of the number of devices of the multi-beam array in the sub-scan direction) times (10×2=20 times in this example), a mask pattern shown in FIG. 20 is generated. Note that the reason why only cells for the half the number of devices are to be processed is that the distribution of the amounts of deviation from scan lines in the even-numbered scan has a phase shift ½ the number of devices with respect to that in the odd-numbered scan. Therefore, by applying the processes to the upper half cells, a mask pattern of the lower half cells is automatically determined.

When the pass dividing process is executed using the mask pattern generated in this way, a latent image can be formed using a device with a smaller amount of deviation from a scan line for a pixel corresponding to each cell. For this reason, the influence of the deviations from scan lines upon forming a latent image using the multi-beam array that suffers the deviations from scan lines can be decreased, and the image quality of an output image can be improved.

Note that the second embodiment has explained the example in which one mask pattern is generated while defining the mask pattern size by the number of devices of the multi-beam array in the sub-scan direction×the printable range (the number of pixels) of the printer engine 106 in the main scan direction. However, the second embodiment is applicable to a case in which an arbitrary number of mask patterns having arbitrary sizes are to be generated. For example, the size of the mask pattern in the main scan direction may be set to be a half of the printable region (the number of pixels) of the printer engine 106 in the main scan direction to generate two mask patterns, and the two mask patterns may be switched in accordance with the position in the main scan direction.

Third Embodiment

Image processing according to the third embodiment of the present invention will be described hereinafter. Note that the same reference numerals in the third embodiment denote the same parts as in the first and second embodiments, and a detailed description thereof will not be repeated.

The third embodiment is the same as the first embodiment, except for the generation method of a mask pattern to be described below. In the following description, assume that the number of devices of the multi-beam array 201 is 1 (main scan direction)×4 (sub-scan direction) as in the first embodiment, for the sake of simplicity. Likewise, in the following description, assume that the printable range of the printer engine 106 in the main scan direction is defined by 10 pixels, the mask size is defined by 10×4 (the printable range in the main scan direction×the number of laser devices in the sub-scan direction), and the number of passes is 2.

Figure 21:
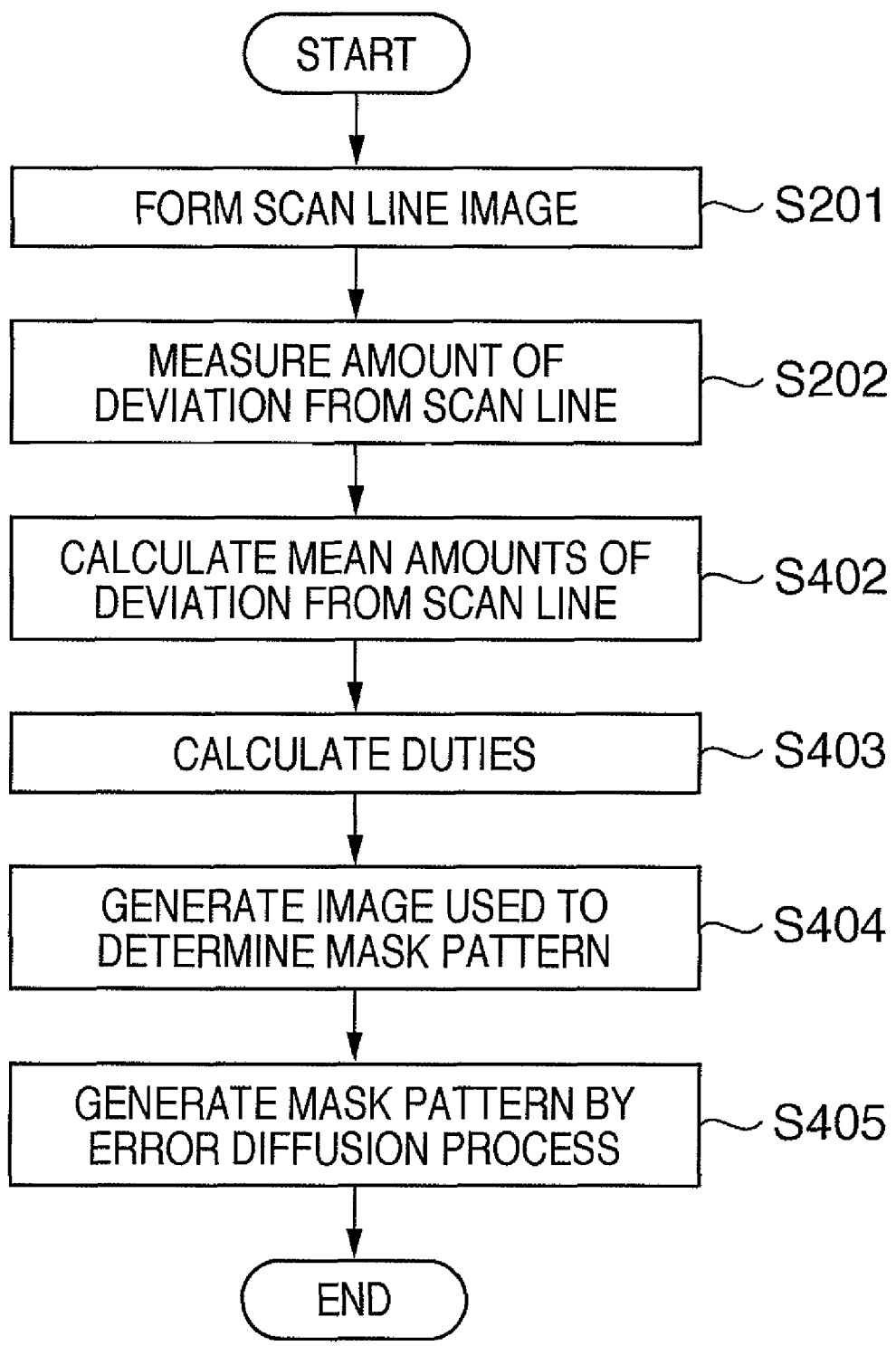
FIG. 21 is a flowchart showing an example of the generation sequence of a mask pattern according to the third embodiment.

FIG. 21 is a flowchart for explaining an example of the generation sequence of a mask pattern according to the third embodiment. The processes in steps S201 and S202 are the same as those in the first embodiment.

After the measurement of the amounts of deviation from scan lines, the mean values of the amounts of deviation from scan lines of respective devices (to be referred to as mean amounts of deviation hereinafter) are calculated (S402).

FIGS. 22A and 22B are views showing examples of the mean amounts of deviation. FIG. 22A shows the mean amounts of deviation in the odd-numbered scan, and FIG. 22B shows those in the even-numbered scan. Note that the mean amounts of deviation shown in FIGS. 22A and 22B have distributions corresponding to a phase shift for two pixels in the sub-scan direction.

Next, the ratios of the number of pixels for which respective devices form latent images to the number of pixels in the main scan direction (to be referred to as duties hereinafter) in respective scans are calculated so that the duties are in inverse proportion to the mean amounts of deviation of the respective devices (S403). In other words, the ratios of forming latent images of pixels (duties) by the respective devices in each scan are determined.

For example, in the odd-numbered scan, let D1 be the mean amount of deviation when the third device in the sub-scan direction forms latent images of all pixels. Also, in the even-numbered scan, let D2 be the mean amount of deviation when the first device in the sub-scan direction forms latent images of all pixels. In this case, a duty P11 of the third device and a duty P21 of the first device have the following relation:

$$P11:P21=1/D1:1/D2 \qquad (1)$$

FIG. 23 is a view showing the calculation results of the duties of the respective devices based on the mean amounts of deviation shown in FIG. 22.

An image used to determine a mask pattern is generated according to the duties (S404). FIG. 24 is a view showing an image of the mask pattern size (5×4 pixels) generated according to the duties shown in FIG. 23. Assuming that a duty=100% expresses black (density=100%), the first line in FIG. 24 corresponds to a duty=45%, the second line corresponds to a duty=60%, the third line corresponds to a duty=55%, and the fourth line corresponds to a duty=40%.

The upper two lines of the image used to generate the mask pattern undergo an error diffusion process. Also, in the lower two lines, a mask pattern is generated to have OFF pixels when pixels in the corresponding upper line are ON, and ON pixels when pixels in the corresponding upper line are OFF (S405). Refer to, for example, "An adaptive algorithm for spatial greyscale", SID International Symposium Digest of Technical Papers, vol. 4.3, 1975, pp. 36-37 for the error diffusion process.

FIG. 25 is a view showing a mask pattern obtained from the image used to generate the mask pattern.

When the pass dividing process is executed using the mask pattern generated in this way, the frequencies of use of devices with larger amounts of deviation from scan lines in the multi-beam array are set to be low, and those of devices with smaller amounts of deviation from scan lines are set to be high upon formation of a latent image. Therefore, when a latent image is formed using the multi-beam array having the mean amounts of deviation shown in FIG. 22, the influence of deviations from scan lines can be decreased, and the image quality of an output image can be improved.

Since the mask pattern is determined by executing the error diffusion process after the duties are determined, the mask pattern which does not interfere with the pattern of a binary image (or an image having a tonal number smaller than that of an input image) can be generated. Therefore, image quality deterioration such as generation of moiré can be suppressed.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-040450, filed Feb. 21, 2008, which is hereby incorporated by reference herein in its entirety.

What is claimed is:

1. An image processing apparatus comprising:
an emitter which has a plurality of light emitting devices arranged in a sub-scan direction;
a former, arranged to form an image on a photosensitive member by multi-passed scanning an identical region on the photosensitive member in a main scan direction using light beams output from the respective light emitting devices of said emitter;
an input section, arranged to input image data of an image to be formed by said former;
a divider, arranged to divide the image data input by said input section into image data for respective scans in the multi-passed scans using a mask pattern generated based on amounts of deviation from scan lines of the light beams output by the respective light emitting devices; and
a supplier, arranged to supply the image data divided by said divider to said emitter in accordance with scans of said former.

2. The apparatus according to claim 1, further comprising an image processor arranged to decrease the tonal number of the image data input by said input section using a threshold table before the process of said divider, wherein the mask pattern is generated based on a relationship between the amounts of deviation from scan lines of the light beams output by the respective light emitting devices, and thresholds in the threshold table.

3. The apparatus according to claim 1, wherein the mask pattern is generated to preferentially use the light emitting device having a small amount of deviation from a scan line of the light beam.

4. The apparatus according to claim 1, wherein the mask pattern is generated to use the respective light emitting devices at ratios which are in inverse proportion to mean amounts of deviation of the light beams output by the respective light emitting devices.

5. The apparatus according to claim 1, wherein said emitter is a multi-beam array.

6. The apparatus according to claim 1, wherein said emitter is a vertical cavity surface emitting laser (VCSEL) diode.

7. An image processing method of an image processing apparatus having an emitter which has a plurality of light emitting devices arranged in a sub-scan direction, and a former arranged to form an image on a photosensitive member by multi-passed scanning an identical region on the photosensitive member in a main scan direction using light beams output from the respective light emitting devices of the emitter, the method comprising the steps of:
inputting image data of an image to be formed by the former;
dividing the image data input in the inputting step into image data for respective scans in the multi-passed scans using a mask pattern generated based on amounts of deviation from scan lines of the light beams output by the respective light emitting devices; and
supplying the image data divided in the dividing step to the emitter in accordance with scans of the former.

8. A non-transitory computer-readable storage medium storing a computer-executable program for causing a computer to perform an image processing method of an image processing apparatus having an emitter which has a plurality of light emitting devices arranged in a sub-scan direction, and a former arranged to form an image on a photosensitive member by multi-passed scanning an identical region on the photosensitive member in a main scan direction using light beams output from the respective light emitting devices of the emitter, the method comprising the steps of:
inputting image data of an image to be formed by the former;
dividing the image data input in the inputting step into image data for respective scans in the multi-passed scans using a mask pattern generated based on amounts of deviation from scan lines of the light beams output by the respective light emitting devices; and
supplying the image data divided in the dividing step to the emitter in accordance with scans of the former.

* * * * *